Oct. 14, 1924.
R. S. RILEY
1,511,981
FASTENING CONSTRUCTION
Original Filed May 14, 1919
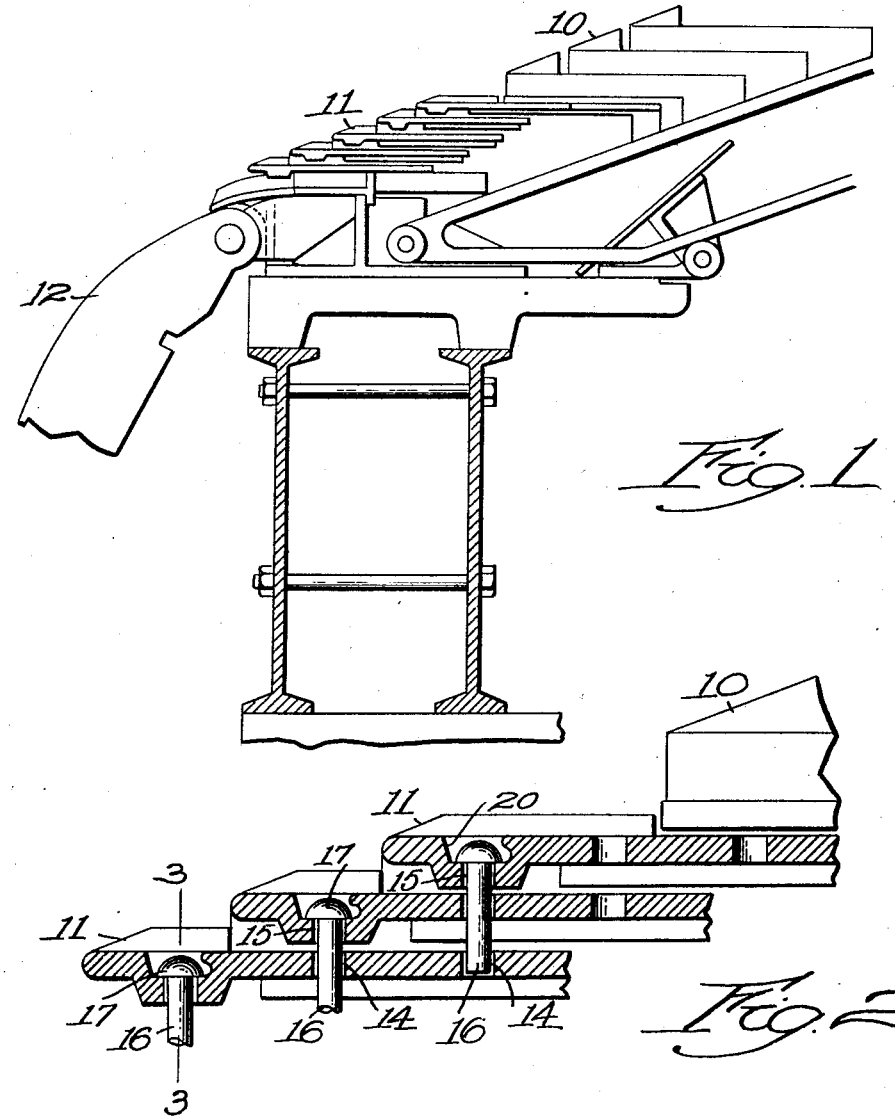
Inventor
Robert S. Riley
By Attorneys
Southgate & Southgate Patented Oct. 14, 1924.

1,511,981

UNITED STATES PATENT OFFICE.

ROBERT SANFORD RILEY, OF WORCESTER, MASSACHUSETTS, ASSIGNOR TO SANFORD RILEY STOKER COMPANY, OF WORCESTER, MASSACHUSETTS, A CORPORATION OF MASSACHUSETTS.

FASTENING CONSTRUCTION.

Original application filed May 14, 1919, Serial No. 297,069. Divided and this application filed August 25, 1922. Serial No. 584,361.

*To all whom it may concern:*

Be it known that I, ROBERT SANFORD RILEY, a citizen of the United States, residing at Worcester, in the county of Worcester and State of Massachusetts, have invented a new and useful Fastening Construction, of which the following is a specification.

This invention relates to a fastening construction capable of general application, but particularly designed for use in furnaces and stoker mechanisms. This application is a division of my application, No. 297,069, filed May 14, 1919, Patent No. 1,441,026, issued Jan. 2, 1923.

It is the general object of my invention to provide a fastening construction by which different parts of a mechanical structure may be secured to each other in such manner that they will be securely held from displacement, while at the same time they may be readily separated when desired.

In the embodiment of my invention herein shown, my improved fastening construction comprises a headed bolt or rod used in combination with a recessed opening of peculiar and special outline.

This preferred form of my invention is shown in the drawings in which

Fig. 1 is a side elevation of parts of an underfeed stoker;

Fig. 2 is a sectional view through certain parts, showing my improved fastening construction; and Fig. 3 is an enlarged sectional view, taken along the line 3—3 in Fig. 2.

Referring to the drawings, I have shown in Fig. 1 parts of a commercial underfeed stoker comprising a reciprocating side wall member 10, movable overfeed grates 11 and a rocking dump plate 12. These parts are in general of the usual type and form no part of my present invention, which relates specifically to a fastening construction by which the grates 11 or other machine parts may be secured together.

It has been the common practice to secure these grates together by means of bolts passing through openings in the grates and held therein by the usual threaded nuts. Such fastening devices are satisfactory as a means for holding the parts together, but it is almost impossible to separate the parts except by breaking the bolts, as the nuts and threads are so affected by the extreme heat and by other working conditions that it is impossible to loosen or remove the nuts after they have been in service for a short time.

My improved fastening construction involves the use of an opening 14 in each lower member to be secured, a corresponding opening 15 in each upper member, and a pin 16 having an enlarged head 17. The openings 14 and 15 somewhat loosely receive the pin 16 and the upper part of each opening 15 is enlarged to form an undercut recess or chamber 18 as indicated in Figs. 2 and 3. At the two sides and one end of this recess, the upper portions 19 of the walls thereof are contracted nearly to the diameter of the head 17 of the pin 16. The remaining end wall is preferably uncontracted and may, in fact, be outwardly inclined as indicated at 20.

In assembling the parts with my improved fastening construction, it is merely necessary to align the openings 14 and 15 and to drop the headed pin 16 into the openings. The recesses 18 are of such a depth that the heads 17 are preferably entirely received therein.

As soon as the parts thus assembled are placed in operation in a furnace or stoker, the remaining space in the recesses 18 is quickly filled with slag and ash, as indicated at 21 in Fig. 3, and the pins 16 are thus held from accidental displacement. If, however, it is desired to separate the parts, it is merely necessary to drive the pin 16 upward to displace the ash and remove the fastener.

My improved fastening construction therefore simplifies the operation both of assembling and separating the parts in furnaces and stokers and in any other structures in which the same conditions obtain.

Having thus described my invention and the advantages thereof, I do not wish to be limited to the details herein disclosed otherwise than as set forth in the claims, but what I claim is:—

1. A fastening construction comprising a lower member having an opening, an upper member having a corresponding opening and a headed fastening device extending through said openings, the opening in said upper member being enlarged to form an undercut recess adapted to loosely receive the head of said fastening device and to be filled with refuse, preventing displacement thereof.

2. A fastening construction comprising a lower member having an opening, an upper member having a corresponding opening, and a headed fastening device extending through said openings, the opening in said upper member being enlarged to form a recess for the head of said fastening device and being upwardly contracted to approximately the width of said head.

3. A fastening construction comprising a lower member having an opening, an upper member having a corresponding opening, and a headed fastening device extending through said openings, the opening in said upper member being enlarged to form a recess for the head of said fastening device and being upwardly contracted on three sides to approximately the width of said head, but being outwardly inclined on the fourth side.

In testimony whereof I have hereunto affixed my signature.

ROBERT SANFORD RILEY.